ical Patent [19]

Shepard, Jr.

[11] 4,242,622
[45] Dec. 30, 1980

[54] STABILIZED NON-LINEAR SERVOMECHANISM

[75] Inventor: Francis H. Shepard, Jr., Summit, N.J.

[73] Assignee: R & I Patent Corporation, Morristown, N.J.

[21] Appl. No.: 38,653

[22] Filed: May 14, 1979

[51] Int. Cl.³ .............................................. G05B 6/02
[52] U.S. Cl. ................................. 318/616; 318/617; 318/618
[58] Field of Search ....................... 318/616, 617, 618

[56] References Cited
U.S. PATENT DOCUMENTS

| 3,648,031 | 3/1972 | Neal | 318/616 X |
| 3,805,137 | 4/1974 | Fahrner | 318/616 X |
| 3,820,712 | 6/1974 | Oswald | 318/618 X |
| 4,032,132 | 6/1977 | Iftikar et al. | 318/617 X |

Primary Examiner—B. Dobeck
Attorney, Agent, or Firm—Burgess, Ryan and Wayne

[57] ABSTRACT

A servomechanism comprising an operational amplifier; a servomotor driven by the amplifier, the amplifier having limited output voltage and current capabilities, i.e. being non-linear; a position sensor; and a position error detector. A negative feedback circuit integrates the limited amplifier output and mixes it with the error signal so as to produce, in the output of the amplifier, a signal proportional in voltage-time product to a derivative of error, even when the output amplitude is limited. Therefore the servo is positioned in the minimum possible time commensurate with the limited capability of the amplifier, without overshoot or undershoot.

During an extended slew, the error signal output of the position error detector also becomes limited. Hence, shorting means are provided to prevent undue build-up of the integrated amplifier output feedback signal during this time, and to short a DC feedback blocking capacitor.

11 Claims, 10 Drawing Figures

STABILIZED NON-LINEAR SERVOMECHANISM

This invention relates to a stabilized non-linear servomechanism, and more particularly to a servomechanism including a limiting amplifier and having optimized step response characteristics.

A great deal of technical literature has been devoted to the design of linear servomechanism circuits. These circuits lend themselves to exhaustive mathematical analysis, due to their linear characteristics. However, relatively little analysis work has been done in the field of non-linear servomechanisms, due to their inherent difficulty of analysis by conventional mathematical techniques.

As a practical matter, however, many servomechanism circuits are inherently non-linear, due to the fact that the amplifiers therein do not have an infinite amplitude range. Therefore, large error signals result in amplifier limiting, with resultant non-linear circuit performance.

An ideal servomechanism must have an amplifier with infinite amplitude range capable of driving a servomotor with infinite velocity, acceleration and jerk. These objectives are obviously unattainable in a real system.

Electric servomotors generally have a transfer function similar to that of a full integration, (velocity to position) and a partial integration (acceleration to velocity). The partial integration is due to the fact that a motor runs at a velocity proportional to applied voltage and reaches that velocity after it has accelerated thereto, whereupon the acceleration ceases; thus the acceleration lag represents only a partial integration. Thus most conventional servomotor drive amplifiers are provided with double differentiating transfer functions, to provide a phase "lead" which combines with the phase "lag" of the servomotor to provide a tolerable level of system response. However, amplifier limiting effects result in disruption of the feedback loop and instability and violent hunting, which must be eliminated by overdamping means which adversely affects servomechanism performance.

Accordingly, an object of the present invention is to provide a servomechanism arrangement which yields a minimum response time to step commands within the voltage and current limits of the amplitude range of a given amplifier.

As herein described there is provided a stabilized non-linear servomechanism arrangement comprising a comparator for generating, at an output terminal thereof, an error signal corresponding to the difference between a first signal indicative of a desired position and a second signal indicative of the actual position of a movable element; an operational amplifier having input and output terminals and a limited output voltage and current range for amplifying said error signal; a motor coupled to said amplifier output terminal and driven by said amplifier, and a movable element driven by said motor; transducer means driven by said movable element for generating said second signal; a feedback circuit interconnected between said operational amplifier output and input terminals and having a transfer function containing a practically complete integration in series with a partial integration which causes the residual signal fed to the amplifier, and hence its output, to contain derivatives that substantially complement the motor lags.

It should be noted here that when the current and voltage to the motor are limited, it takes longer to reach a desired position.

The same amplifier limits are applied to the feedback integrators so that it takes longer to build up the negative feedback signal. Accordingly, the time that amplifier output is applied to the motor is correspondingly extended.

In the linear amplifier range, the above described means will cause the error signal and amplifier output to substantially be a function of position called for differentiated fully and then partially differentiated so that the servo output will practically follow the position called for with negligible lag.

In the case where amplifier limiting occurs, the above circuit means "spoils" the derivatives of position called for, extending the duration of the corresponding error signal to substantially match the extended integrations of the motor due to the limited voltage and current output of the amplifier. In this way "dead beat" operation is obtained in the shortest possible time for any position called for.

Also herein described is a stabilized non-linear servomechanism arrangement comprising a movable element; a comparator for generating, at an output terminal thereof, an error signal corresponding to the difference between a first signal indicative of a desired position and a second signal indicative of the actual position of said movable element; an operational amplifier having input and output terminals and a limited output voltage and current range for amplifying said error signal; an electric motor having a drive winding coupled to said amplifier output terminal and driven by said amplifier, said movable element being coupled to and driven by said motor; transducer means driven by said motor for generating said second signal; a double integrating resistance-capacitance feedback circuit including a first capacitor connected in series between said comparator output terminal and said amplifier input terminal, and a second capacitor connected in series with the integrated feedback between said input and output terminals of said amplifier; means for shorting to ground said first capacitor when the error voltage to said amplifier is at the positive or negative limit of the comparator output, and means for shortcircuiting said second capacitor when said error signal has an amplitude greater than a predetermined threshold value.

IN THE DRAWING

FIG. 2c shows waveforms associated with the circuit of FIG. 1c wherein both acceleration and velocity limits are compensated for;

Figure 1A:
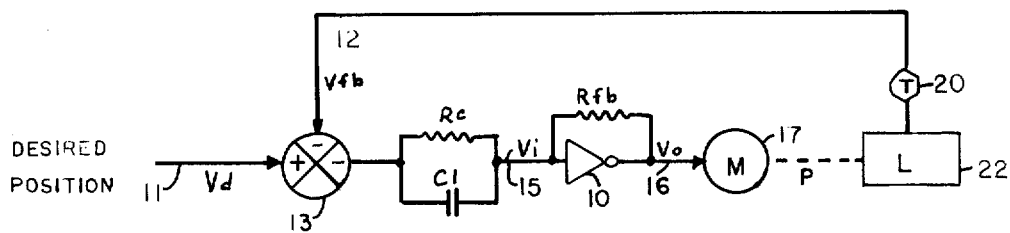
FIG. 1a is a functional block diagram which shows an idealized embodiment of the invention employing a servomotor with instantaneous acceleration capabilities.
Figure 1B:
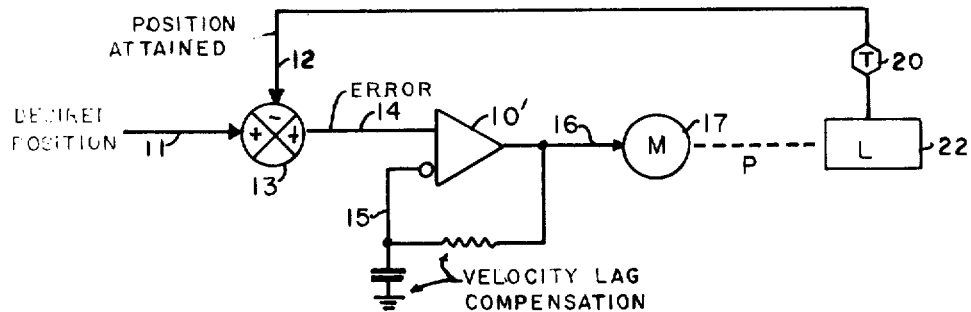
FIG. 1b is a functional block diagram of a circuit having identical characteristics to those of FIG. 1a; however, the differential amplifier therein more clearly separates the function of error input from negative integral feedback—only velocity lag compensation is shown in FIG. 1b.
Figure 1C:
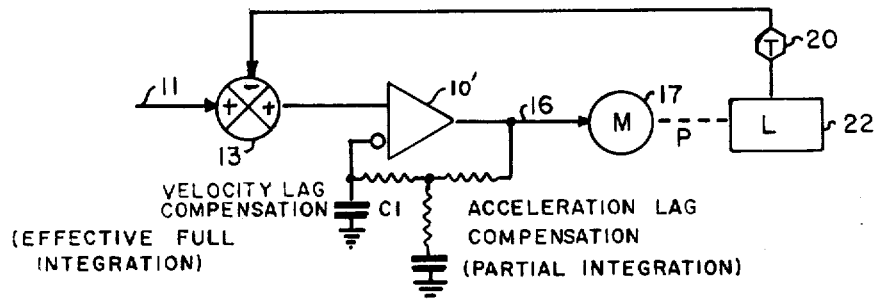
FIG. 1c shows a similar circuit with the addition of a partial integration to compensate for acceleration lag.

The servomechanisms of FIGS. 1a and 1b are idealized circuits having "perfect" component elements, except that the operational amplifiers 10 and 10' have limited voltage output amplitude and unlimited current output.

An input signal on line 11 representing desired position of the movable element or load L, is compared with a feedback signal on line 12 corresponding to the actual position of the load L. The feedback signal on line 12 is derived from a transducer T which is driven by the servomotor M, through the load L.

An error detector or comparator 13 subtracts the feedback signal from the desired position signal and generates a resultant error signal on line 14, said error signal being amplified and effectively differentiated by the operational amplifier 10 in conjunction with its negative feedback circuit elements comprising resistors $R_c$, $R_{fb}$ and integrating capacitor $C_1$. The input signal to the amplifier 10 is provided on line 15. The servomotor M, which has the characteristic of an ideal integrator, is coupled to the load or movable element by a power train P.

In the circuit of FIG. 1a, the operational amplifier 10 has a linear range within which it functions, in conjunction with the circuit elements $R_c$, $F_{fb}$ and $C_1$, as an ideal differentiator. However, when driven to the limited (positive or negative) voltage output of the amplifier, the negative feedback integrating circuit elements $R_c$, $R_{fb}$, and $C_1$, take longer to build up a feedback voltage and hence the effective differentiated output of the amplifier is stretched in time to make up (in area or voltage-time product) for the volt-seconds derivative lost by limiting. The amplifier 10 limits at both the high and low extremes of its amplitude range.

Figure 2C:
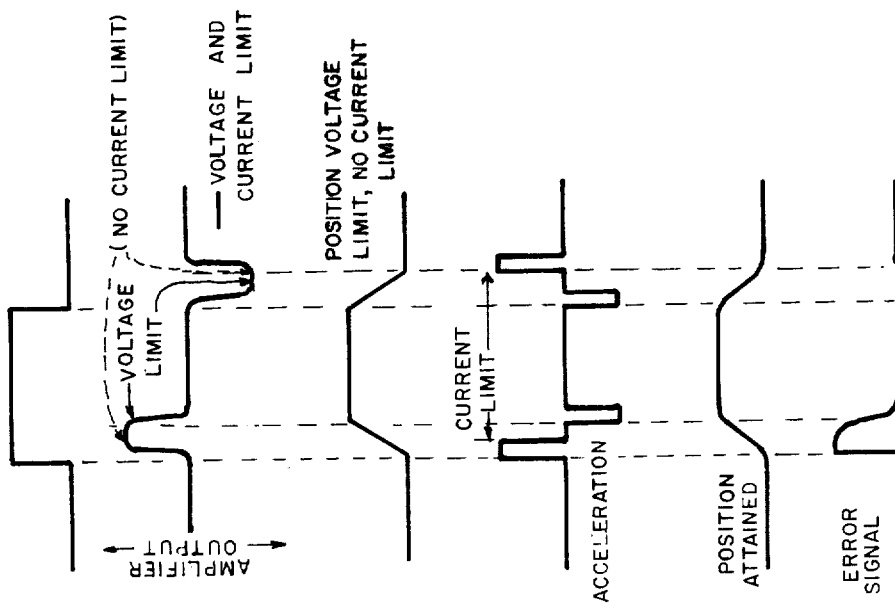
Figure 2B:
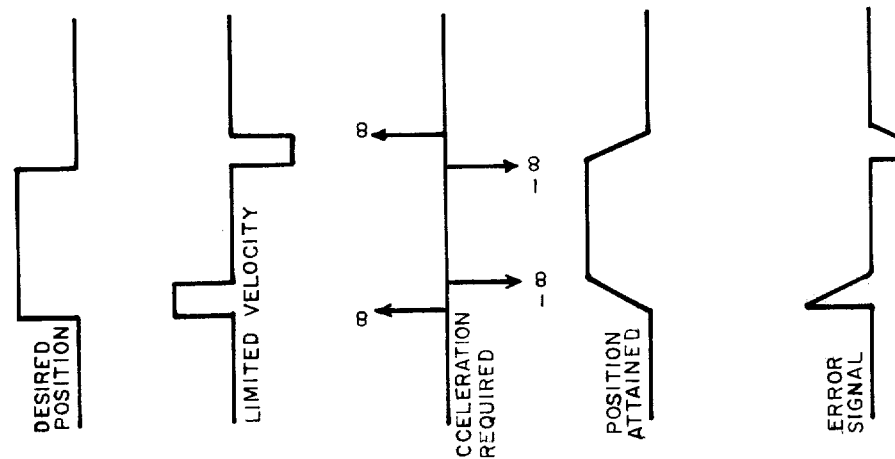
FIG. 2b shows waveforms of the circuits of FIG. 1a and 1b assuming unlimited acceleration capability.

Waveforms illustrating the operation of the circuit of FIGS. 1a and 1b in response to a step input command are shown in FIG. 2b in which it is seen that the "desired position" signal has a step waveform with vertical leading and trailing edges. The actual position of the load or movable element L is a modified waveform with sloped leading and trailing edges. The slope of each edge has a value corresponding to the maximum velocity the servomotor M is capable of attaining under full drive voltage of the amplifier 10.

That is, when a step signal is received, the circuits of FIG. 1a and 1b cause the servomotor M to instantaneously accelerate to its maximum available velocity, to maintain that velocity until the desired position is reached, and to then instantaneously decelerate to a stop. The same process is followed at the trailing edge of the waveform.

The desired position step signal on line 11 is coupled through the comparator 13 to line 14, without distortion, since there is initially no feedback signal.

Figure 2A:
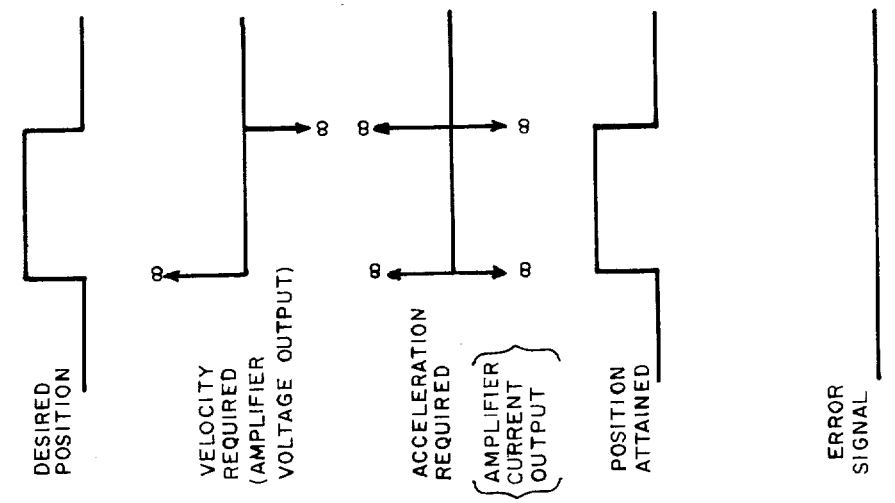
FIG. 2a shows waveforms of an ideal servomechaism with unlimited drive.

If the differentiator comprising amplifier 10 and its associated circuit elements were ideal, the output of the amplifier 10 would correspond to the "desired velocity" waveform of FIG. 2a, i.e. a positive impulse of infinite amplitude at the leading edge of the step, and a corresponding negative impulse at the trailing edge thereof. However, because the amplifier 10 has amplitude limiting characteristics, it provides with the aid of the integrating feedback a signal to the servomotor M on the output line 16 thereof, which corresponds to the "actual velocity" waveform of FIG. 2b.

This "actual velocity" waveform in effect "stretches" the width of the impulse waveform corresponding to the limited velocity and provides full drive to the servomotor M for a sufficient time to enable the servomotor to reach the desired position. It is this "stretching" performance of the amplifier 10 and its associated circuit element which provides the basis for a principal feature of the present invention.

The amplifier input voltage on line 15 which drives the aforementioned amplifier to its limited output voltage, is illustrated as the lowermost waveform in FIG. 2b. The amplifier input voltage is "stretched" as a result of limiting of the output of amplifier 10 on line 16. This limiting extends the time taken to develop responsive feedback via the resistor $R_{fb}$, across capacitor $C_1$, and permits the input to amplifier on line 15 to move outside a nominal "0" value (maintained under closed loop conditions as a result of the virtually infinite open loop gain of the amplifier 10).

Thus, limiting of the amplifiers 10 and 10' results in "pulse stretching" of step input signals representing desired position, and it is this stretching phenomenon which is utilized in the arrangement of the present invention.

As seen in FIG. 2a, the operation of the amplifier 10 in conjunction with the associated circuit elements thereof, and the closed feedback loop through the servomotor M, results in the amplifier output on line 16 remaining at its upper and lower limits for precisely the required time to drive the servomotor M to the desired position. Obviously this arrangement provides the minimum possible response time considering the limited amplifier output and motor drive capabilities of the amplifiers 10 and 10', and servomotor M. The circuit is such that there is no undesired overshoot, undershoot or hunting.

When reference is made hereafter to the "transfer function" of an amplifier or a servomotor, said terms should be understood as referring to the transfer functions thereof in the linear range of operation of said elements.

Figure 1D:
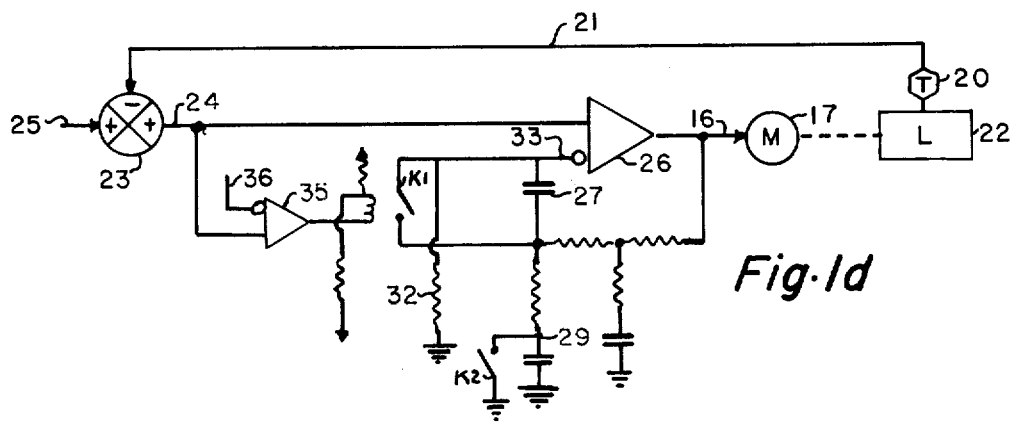
FIG. 1d shows a similar circuit with the addition of a larger capacitor in series with the negative feedback and a large bias resistor from the negative amplifier input to ground.
Figure 4:
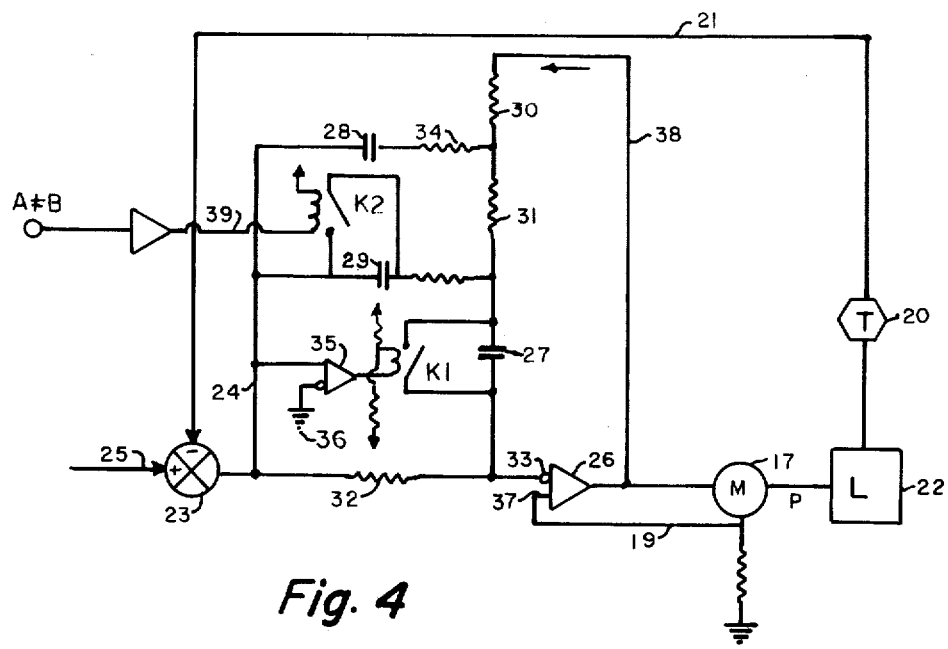
FIG. 4 is a functional block diagram of a servomechanism according to a preferred embodiment of the invention.

FIG. 1d and FIG. 4 show functional diagrams of servomechanisms according to preferred embodiments of the invention, illustrating practical systems. The servomotor 17 is a typical electric servomotor having a transfer function generally similar to that of a double integrator, i.e., one full integration, (velocity integrated equals position). However, since the velocity of a servomotor is ultimately directly proportional to the amplifier output voltage, acceleration ceases when this velocity is reached. Therefore, in the actual system the acceleration lag becomes a partial integration and can be compensated for, for system stability, by the circuit shown and marked FIG. 1d.

The capacitor-resistor combination shown in FIG. 1d will pass all the dynamic frequencies necessary for servo stabilization while allowing full amplifier gain (no negative feedback), for DC. This feature allows the servo to supply output to hold a static load with substantially zero error. Since large excursions of position called for with limited velocity and acceleration will take appreciable time, excessive voltage can be accumulated across the DC feedback blocking capacitor which will take time to leak off before proper balance (zero error) can be attained. To avoid this condition it is desirable to unblock the DC negative feedbacks when the error exceeds preselected positive and negative limits. This is accomplished by the error sensing electronic switch shown diagrammatically in FIG. 1d.

The waveforms in FIG. 2c illustrate the performance of this circuit. The effect of current (acceleration) limiting due to limited current output of the amplifier is due to the finite amplifier voltage output and the fact that practical servomotors have armature resistance. This limiting effect is also shown by the third from bottom curve of FIG. 2c. A transducer 20 is mechanically coupled to the motor 17 or load 22, and provides a feedback signal on line 21 corresponding to the actual position of a movable element or load 22 also driven by the motor 17.

An error detector or comparator 23 generates an error voltage on line 24 corresponding to the difference between the signal on line 21 and a signal on line 25 corresponding to desired position of the movable element 22.

The error signal on line 24 is amplified and effectively double differentiated by subtracting from the error the double integral of the amplifier output, i.e., effectively one full integration and one partial integration. The resistors in series with the integrating capacitors are for the purpose of suppressing oscillations; i.e., if the gain around the amplifier feedback loop exceeds unity when the phase lag in the two integrations approaches 180 degrees, the circuit will oscillate.

The input resistor 32 has a relatively high value and serves to provide DC coupling to the inverting input terminal 33 of amplifier 26.

The DC blocking capacitor 27 effectively opens the feedback loop at zero frequency, providing high DC gain, while passing all the dynamic frequencies necessary for servo stabilization.

When A is not equal to B the error signal is limited (in either the positive or negative direction) and there is no indication of how far out the error is. Hence no significant stabilizing feedback signals can be generated. When entering the A = B (linear) extra error lead is needed. To accomplish this we use the A = B signal. An electronic switch is therefore caused to close to prevent voltage buildup across the velocity compensating capacitor, thereby providing (on release of the switch) an extra amount of lead when slewing from A < B or A > B. See FIG. 1d and the position waveforms in FIG. 3.

As explained above, if a long slew is called for at full velocity (limited amplifier output), an undesired voltage can be accumulated across the DC blocking capacitor which will take time to dissipate, thus taking extra time to come to zero error.

This effect is avoided by the electronic switch which shorts the blocking capacitor whenever the error exceeds a specified amount. This switch (or relay) K1 is driven by a comparator-amplifier 35, which has inputs corresponding to a reference signal on line 36, and the system error signal on line 24. Relays K1 and K2 have different threshold actuating inputs, so that relay K1 is actuated by an error signal that would adjust the output to the limit of the amplifier 26, i.e., whenever the output of the amplifier 26 is limited in amplitude or outside its linear range. Relay K2, on the other hand, is actuated whenever the error signal on line 24 is outside its linear range. See the above description of digital error means and refer to FIG. 3; i.e., K2 is closed when A≠B.

Positive current feedback for improved motor response is provided to the non-inverting terminal 37 (FIG. 4) of amplifier 26 via line 19; i.e., when amplifier 26 is not limiting, positive current feedback effectively neutralizes armature resistance.

Thus, capacitor 27 and resistors 32 contribute relatively little to the AC transfer function being determined primarily by capacitors 28 and 29 and resistors 30 and 31.

Waveforms associated with the performance of the circuit shown in FIG. 4 are illustrated in FIG. 2c, wherein the "desired position" signal is a step function. The actual position curve is arcuate rather than linear, as a result of the finite acceleration capabilities of the circuit.

The signal which initially appears at input terminal 33, corresponding to desired velocity, is an impulse (i.e., a positive impulse at the leading edge of the step and a negative impulse at the trailing edge thereof) which is "stretched" due to the operation of the amplifier 26 and its associated circuit elements, to provide the "actual velocity" of the load 22 as shown in FIG. 2c. The corresponding output voltage of amplifier 26 on line 38 is shown as the "amplifier output voltage" waveform in FIG. 2c.

As shown in the "amplifier output voltage" waveform of FIG. 2c, the circuit of FIG. 4 operates in such a manner that the amplifier 26 is at all times driven to its limiting positive or negative output voltage levels, so that the servomotor 17 is at all times, except when desired position is being reached, subjected to maximum drive. The circuit operates to control the time duration of the drive in each direction so that the servomotor 17 reaches its desired position in the minimum time possible for an amplifier and a servomotor having specified limiting characterics.

The performance shown in FIG. 2c, i.e. operation of the amplifier 26 and servomotor 17 at their maximum limits at all times, is achieved when the transfer function F(s) of the feedback circuit of the operational amplifier 26, and the transfer function G(s) of the servomotor 17 and its associated mechanical and electrical elements, are so related that the ratio F(s)/G(s) is substantially independent of the s, the Laplace transform parameter.

By short-circuiting the blocking capacitor 27 during slewing operations, i.e. when the error signal on line 24 is of sufficient amplitude to cause the amplifier 26 to operate outside its linear range, undesirable system delay and/or transients are avoided. Similar performance improvements are provided by short-circuiting or grounding the first stabilizing capacitor 29 when the error signal on line 24 has a magnitude exceeding its linear range, (see FIG. 3), i.e. A≠B.

Figure 5:
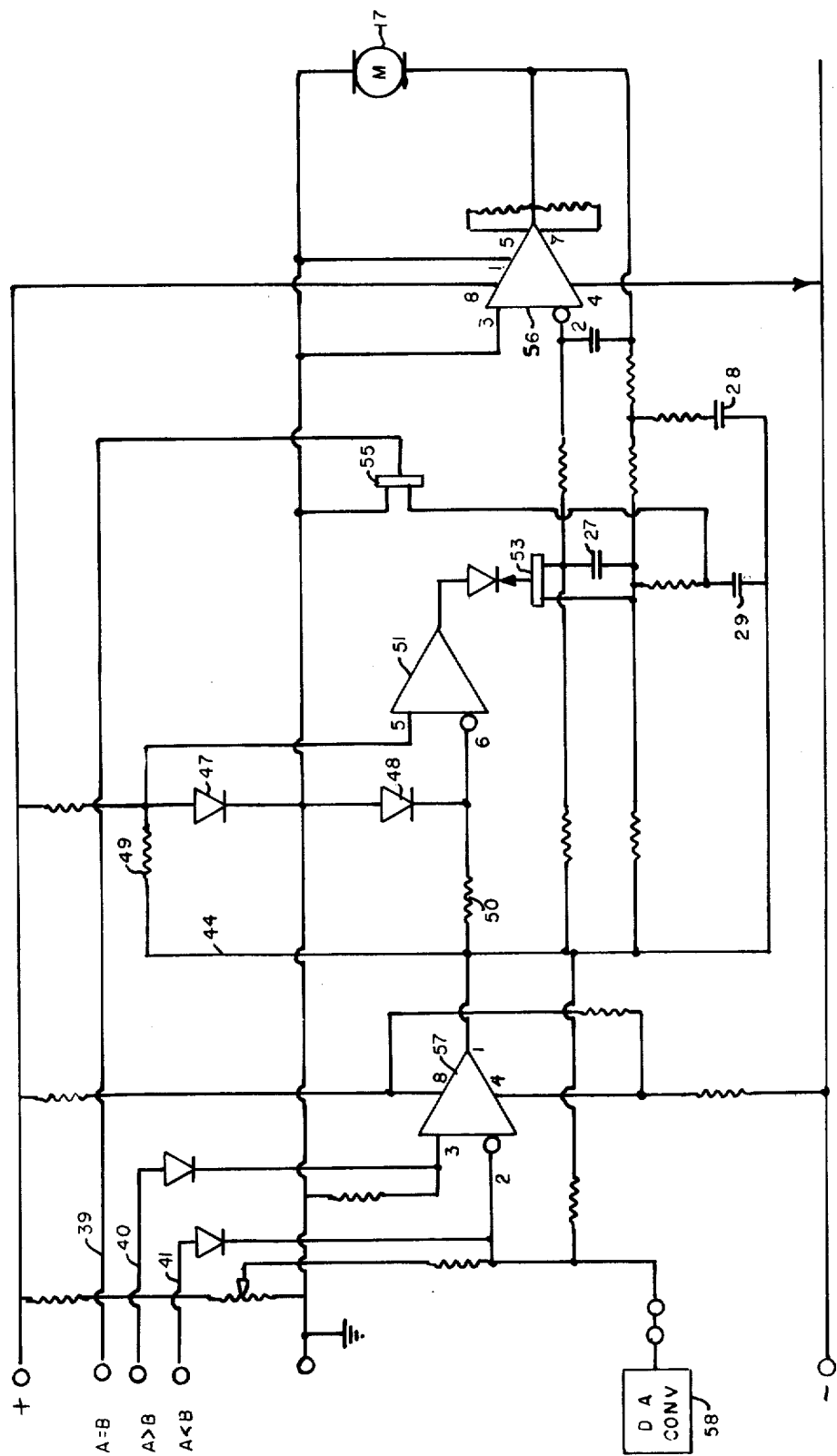
FIG. 5 is a schematic diagram of an amplifier according to a preferred embodiment of the invention.

The schematic diagram in FIG. 5 shows an actual servomechanism circuit arrangement embodying the invention as described with reference to FIG. 4.

Those elements of FIG. 4 which serve a similar function in FIG. 5 are provided with corresponding numerals therein, for purposes of facilitating explanation of the circuit.

Signals to the circuit shown in FIG. 5 are provided from a digital comparator (not shown) as a result of comparison between a signal A corresponding to desired position count and the signal B corresponding to actual position count of the load 22 coupled to the servomotor. (See FIG. 3 for position vs output curves). When these two signals are equal, as defined by high order bits, a high signal is provided on input line 39; when the desired position signal A exceeds the actual position signal B as defined by high order bits, a positive signal is provided on line 40; and when the actual signal exceeds the desired position signal A≠B, a positive signal is provided on line 41. The resultant error signals are coupled respectively to either terminal 3 or terminal 2 of differential input operational amplifier 57.

A bridge sensing circuit comprising diodes 47 and 48 and resistors 49 and 50, senses when the amplified error signal is within a predetermined range, i.e. approximately +or −1 volt. The bridge circuit comprising diodes 47 and 48 and resistors 49 and 50 provides a rectified output signal between the differential inputs of amplifier 51. When the error signal is sufficiently large (in either direction) to cause either diode 47 or 48 to conduct, a differential input to amplifier 51 is generated, causing its output to go negative and thereby turning on MOSFET switching transistor 53.

Thus, transistor 53 corresponds to the relay contact K1 of FIG. 4.

Whenever the actual and desired positions of the load 22 are unequal, as defined by high order bits, and, as indicated, the absence of a signal on line 39, MOSFET transistor 55 is conductive, so that the stabilizing capacitor 29 is effectively short-circuited, except when the actual and desired position of the load 22, as indicated by the signal on line 39, "coincide", i.e. the coarse bits A=B.

The drive voltage for the motor 17 is provided by an integrated circuit power amplifier 56, which may for example be the type ICH8520 power amplifier manufactured by Intersil, Inc., Cuperting, California.

Figure 3:
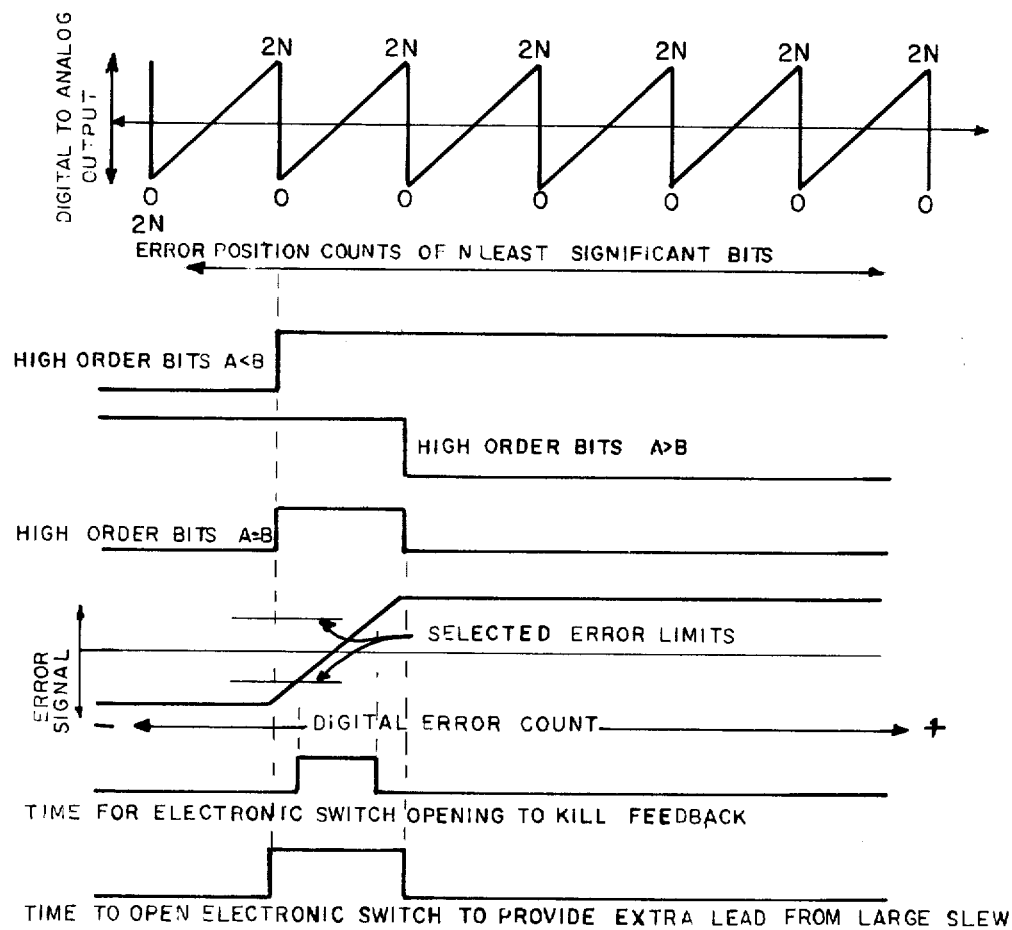
FIG. 3 shows the output waveforms of the digital to analog error processing circuits of a preferred embodiment of the invention.

The power amplifier performs a function comparable to that of the amplifier 26 in FIG. 1d and FIG. 4 while the operational amplifier 57 in combination with the D-A converter 58 of FIG. 5 performs a function similar to that of the error voltage amplifier/comparator 23 of FIG. 1d and FIG. 4, as explained by the displacement curves in FIG. 3.

What is claimed is:

1. In a stabilized non-linear servomechanism arrangement, comprising:
    a comparator for generating, at an output terminal thereof, an error signal corresponding to the difference between a first signal indicative of a desired position and a second signal indicative of the actual position of a movable element;
    an operational amplifier having input and output terminals and a limited output voltage range for amplifying said error signal;
    a motor coupled to said amplifier output terminal and driven by said amplifier, and a movable element driven by said motor;
    transducer means coupled to said movable element for generating said second signals;
    a negative feedback circuit interconnected between said operational amplifier output and input terminals and having a transfer function F(s) therebetween, where s is the Laplace transform parameter, the output position to electrical input signal transfer function of said motor and any associated electrical and mechanical elements being G(s),
    the improvement wherein said feedback circuit has a characteristic such that the ratio F(s)/G(s) is substantially independent of s, said feedback circuit introducing to the input of said amplifier a drive signal corresponding to the derivative of said error signal and causing the time duration of said drive signal to be extended when the output of said amplifier reaches a limit of the voltage range thereof.

2. The improvement according to claim 1, wherein said feedback circuit includes a first integrating capacitor coupled to said input terminal and a first feedback resistor coupled between said input and output terminals of said amplifier.

3. The improvement according to claim 2, further comprising means for short-circuiting said first integrating capacitor when the value of said error signal is at a limit of the voltage range thereof.

4. The improvement according to claim 2, wherein said feedback circuit includes a DC blocking capacitor in series with said feedback circuit.

5. The improvement according to claim 2, further comprising capacitor means for preventing DC feedback via said feedback circuit, and means for short-circuiting said capacitor means when said error signal has an amplitude greater than a predetermined threshold value.

6. In a stabilized non-linear servomechanism arrangement, comprising:
    a comparator for generating, at an output terminal thereof, an error signal corresponding to the difference between a first signal indicative of a desired position and a second signal indicative of the actual position of a movable element;
    an operational amplifier having input and output terminals and a limited output voltage range for amplifying said error signal;
    a motor coupled to said amplifier output terminal and driven by said amplifier, and a movable element driven by said motor;
    transducer means for sensing the position of said movable element and thereby generating said second signal; the improvement comprising:
    a negative feedback circuit interconnected between said operational amplifier output and input terminals incorporating at least one practical integration, the output of said feedback circuit being combined with the error signal for making the amplifier input contain a derivative of error and to cause said derivative to be artificially extended when amplifier limiting occurs.

7. The improvement according to claim 6, wherein said feedback circuit includes a first integrating capacitor coupled to said input terminal and a first feedback resistor coupled between said input and output terminals of said amplifier.

8. The improvement according to claim 7, further comprising means for short-circuiting said first integrating capacitor when the output voltage of said error signal is at a limit of its voltage range.

9. The improvement according to claim 1, wherein said motor is an electric motor, further comprising a positive feedback circuit for coupling a positive feedback signal to an input terminal of said amplifier, the value of said positive feedback signal corresponding to the current through a drive winding of said electric motor, to effectively neutralize at least a portion of the resistance of said winding.

10. A stabilized non-linear servomechanism arrangement, comprising:
   a movable element;
   a comparator for generating, at an output terminal thereof, an error signal corresponding to the difference between a first signal indicative of a desired position and a second signal indicative of the actual position of said movable element;
   an operational amplifier having input and output terminals and a limited output voltage range for amplifying said error signals;
   an electric motor having a drive winding coupled to said amplifier output terminal and driven by said amplifier, said movable element being coupled to and driven by said motor;
   transducer means coupled to said movable element for generating said second signal;
   a double integrating resistance-capacitance feedback circuit including a first capacitor connected in series between said comparator output terminal and said amplifier input terminal, and a second capacitor connected in series between said input and output terminals of said amplifier;
   means for short-circuiting said first capacitor when the value of the voltage of said error signal is at a limit of the voltage range thereof; and
   means for short-circuiting said second capacitor when said error signal has an amplitude greater than a predetermined threshold value.

11. The arrangement according to claim 10, further comprising means for coupling a positive feedback signal having a value corresponding to the current through said motor drive winding to an input terminal of said amplifier, to effectively neutralize at least a portion of the resistance of said winding.

* * * * *